United States Patent
Akbulut et al.

(10) Patent No.: US 12,412,045 B2
(45) Date of Patent: Sep. 9, 2025

(54) SELF-CONTAINED CONVERSATIONAL EXPERIENCE PREVIEWING

(71) Applicant: International Business Machines Corporation, Armonk, NY (US)

(72) Inventors: Muhtar Burak Akbulut, Waban, MA (US); Pankaj Dhoolia, Ghaziabad (IN); Dan O'Connor, Milton, MA (US); Andy James Stoneberg, Clarksburg, MD (US); Venkat Raghavan Ganesh Sekar, Lowell, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 458 days.

(21) Appl. No.: 17/953,443

(22) Filed: Sep. 27, 2022

(65) Prior Publication Data
US 2024/0104307 A1    Mar. 28, 2024

(51) Int. Cl.
*G06F 17/27* (2006.01)
*G06F 40/35* (2020.01)
*H04L 51/02* (2022.01)

(52) U.S. Cl.
CPC ............ *G06F 40/35* (2020.01); *H04L 51/02* (2013.01)

(58) Field of Classification Search
CPC ......... G06F 40/35; G06F 17/10; G10L 15/19; H04L 51/02; H04N 1/00005
USPC ............................................................ 704/9
See application file for complete search history.

(56) References Cited

U.S. PATENT DOCUMENTS

| | | | |
|---|---|---|---|
| 7,627,821 B2 | 12/2009 | Klementiev | |
| 7,653,896 B2 | 1/2010 | Herdeg, III | |
| 10,010,793 B2 | 7/2018 | Johnson et al. | |
| 10,887,264 B2 | 1/2021 | Le Huerou et al. | |
| 10,909,327 B2 | 2/2021 | Madan et al. | |
| 10,929,266 B1 | 2/2021 | Goradia et al. | |
| 11,336,595 B2 | 5/2022 | Uppala et al. | |
| 2012/0131456 A1 | 5/2012 | Lin et al. | |
| 2017/0013138 A1* | 1/2017 | Muraishi | H04N 1/00005 |
| 2021/0166141 A1* | 6/2021 | Taguchi | G06F 17/10 |
| 2021/0249002 A1* | 8/2021 | Ahmadidaneshashtiani | G06F 40/284 |
| 2022/0360544 A1* | 11/2022 | Mingels | G06F 16/9024 |

FOREIGN PATENT DOCUMENTS

CN    115968468 A    *    4/2023    ............ G06F 11/302

* cited by examiner

*Primary Examiner* — Md S Elahee
(74) *Attorney, Agent, or Firm* — Garg Law Firm, PLLC; Rakesh Garg; Kristofer Haggerty

(57) ABSTRACT

A plurality of constraints associated with conversational steps implemented by a conversation model is extracted from the conversation model. Using the conversational steps and the constraints, a directed graph is constructed, each node in the directed graph representing a conversational step, each directed edge in the directed graph representing a possible execution path from a first conversational step to a second conversational step. An edge in the graph is populated with flow data denoting a probability associated with the edge. By traversing a portion of the graph, an experience preview is generated, the experience preview demonstrating a user experience of a portion of the conversation model.

18 Claims, 11 Drawing Sheets

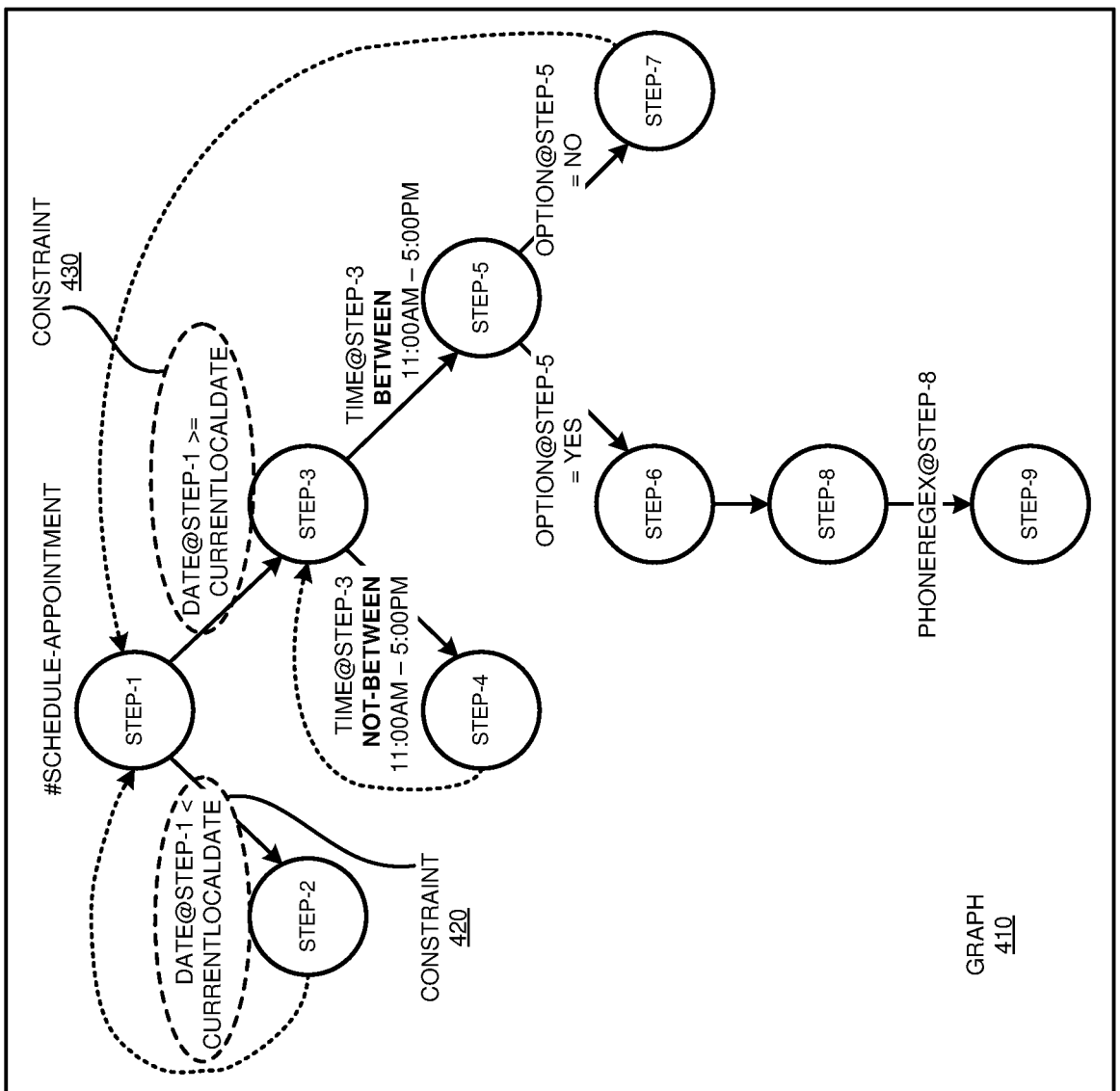
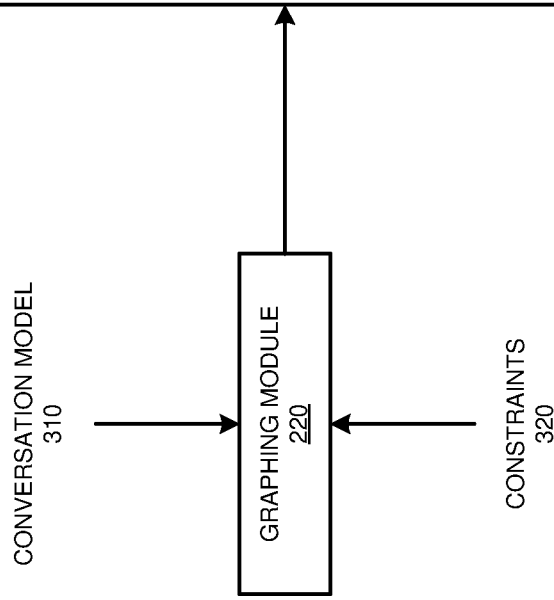
Fig. 4

Fig. 8

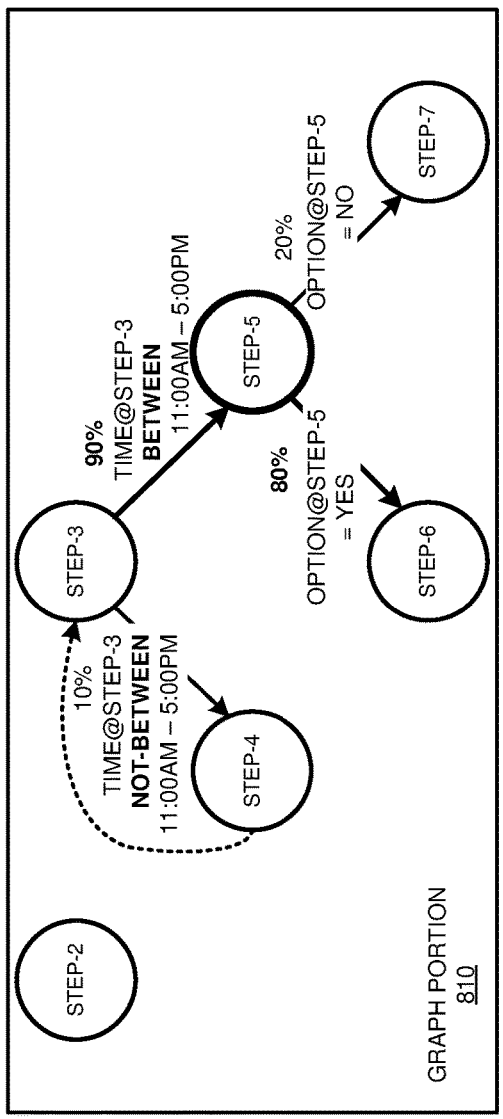

GRAPH PORTION 810

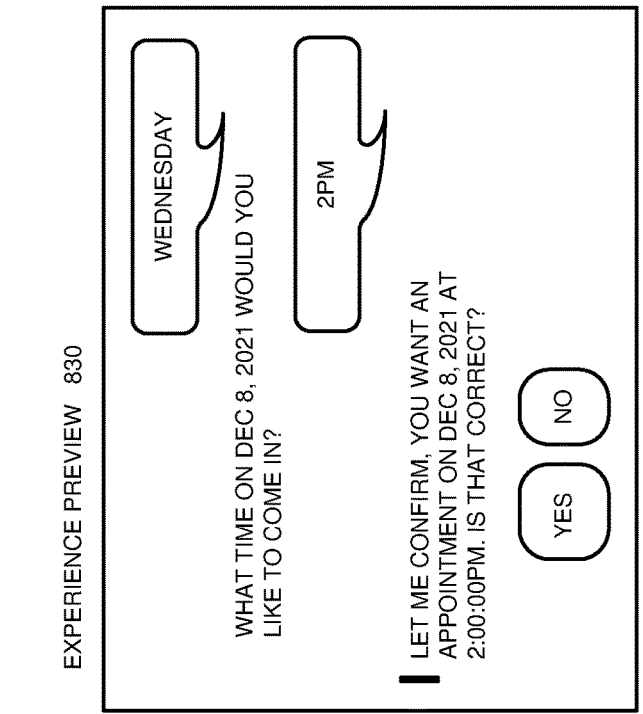

EXPERIENCE PREVIEW 830

TRAVERSAL 820

USER : SCHEDULE AN APPOINTMENT
ASSISTANT : WHAT DAY WOULD YOU LIKE TO COME IN?
PICK A DATE?
BRANCH POINT : (
  10% BEFORE CURRENT DATE |
  90% AFTER CURRENT DATE
)
USER : WEDNESDAY
ASSISTANT : WHAT TIME ON DEC 8, 2021 WOULD YOU LIKE
TO COME IN?
PICK A TIME?
BRANCH POINT : (
  10% NOT BETWEEN 11:00AM – 5:00PM |
  90% BETWEEN 11:00AM – 5:00PM
)
USER : 2PM
ASSISTANT : LET ME CONFIRM, YOU WANT AN APPOINTMENT
ON DEC 8, 2021 AT 2:00PM. IS THAT CORRECT?
PICK AN OPTION?
BRANCH POINT : (80% YES | 20% NO)

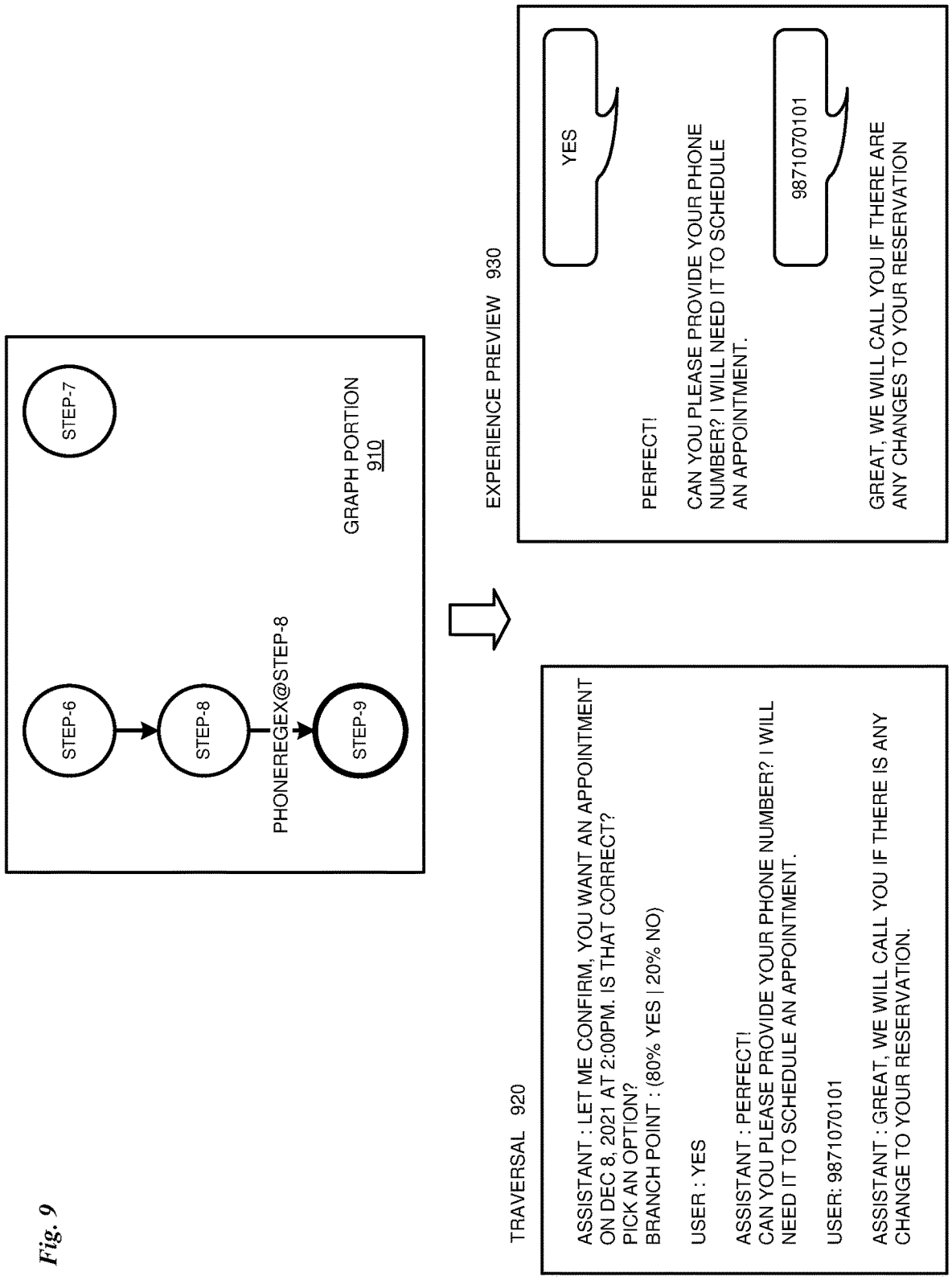

SELF-CONTAINED CONVERSATIONAL EXPERIENCE PREVIEWING

BACKGROUND

The present invention relates generally to a method, system, and computer program product for conversational experience analysis. More particularly, the present invention relates to a method, system, and computer program product for self-contained conversational experience previewing.

A chatbot is a software application used to conduct a natural language interaction with a (typically human) user. User inputs are either in natural language text form or converted to natural language text form from another format, such as speech in audio or video form. Outputs from the system are also either in natural language text form or converted from natural language text form to another format, such as speech in audio or video. User inputs need not be grammatically correct, or in the form of complete sentences. For example, some user interactions might be simply "yes" or "no". Developing a chatbot typically includes developing one or more conversational journeys, which are possible routes an interaction could take, depending on prompts from the application and inputs from a user. An input from a user is also called an utterance.

A chatbot uses a conversational model to process user inputs and generate responsive outputs. One component of a conversational model is the intents and entities the model knows how to process. An intent is a purpose or goal the user has for an interaction with the chatbot. An action is a step, or related set of steps, that is triggered by an intent and that comprise a logical end to end flow. Intents and actions are used interchangeably herein. Some example intents and actions are "make a reservation", "get account balance", and "refill a prescription for a medication". Entities are nouns the chatbot knows about, for example days of the week, types of accounts, types of medications, available locations, and the like. Another component of a conversational model is the dialogue flow associated with a conversational journey the model implements. Dialogue flow is typically modelled as a set of dialogue nodes. A dialogue node is a step in a conversational journey. For example, a conversational journey implementing a "get account balance" intent might include a sequence of nodes, or conversational steps, to ask the user for a username, password, and to specify a particular account if the user has more than one. There might also be another node to determine the user's intent, as well as a node to ask the user if another service is desired.

SUMMARY

The illustrative embodiments provide a method, system, and computer program product. An embodiment includes a method that extracts, from a conversation model, a plurality of constraints associated with conversational steps implemented by the conversation model. An embodiment constructs, using the conversational steps and the constraints, a directed graph, each node in the directed graph representing a conversational step, each directed edge in the directed graph representing a possible execution path from a first conversational step to a second conversational step. An embodiment populates an edge in the graph with flow data denoting a probability associated with the edge. An embodiment generates, by traversing a portion of the graph, an experience preview, the experience preview demonstrating a user experience of a portion of the conversation model.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a continued example of self-contained conversational experience previewing in accordance with an illustrative embodiment;

FIG. 8 depicts a continued example of self-contained conversational experience previewing in accordance with an illustrative embodiment;

FIG. 9 depicts a continued example of self-contained conversational experience previewing in accordance with an illustrative embodiment;

DETAILED DESCRIPTION

Figure 1:
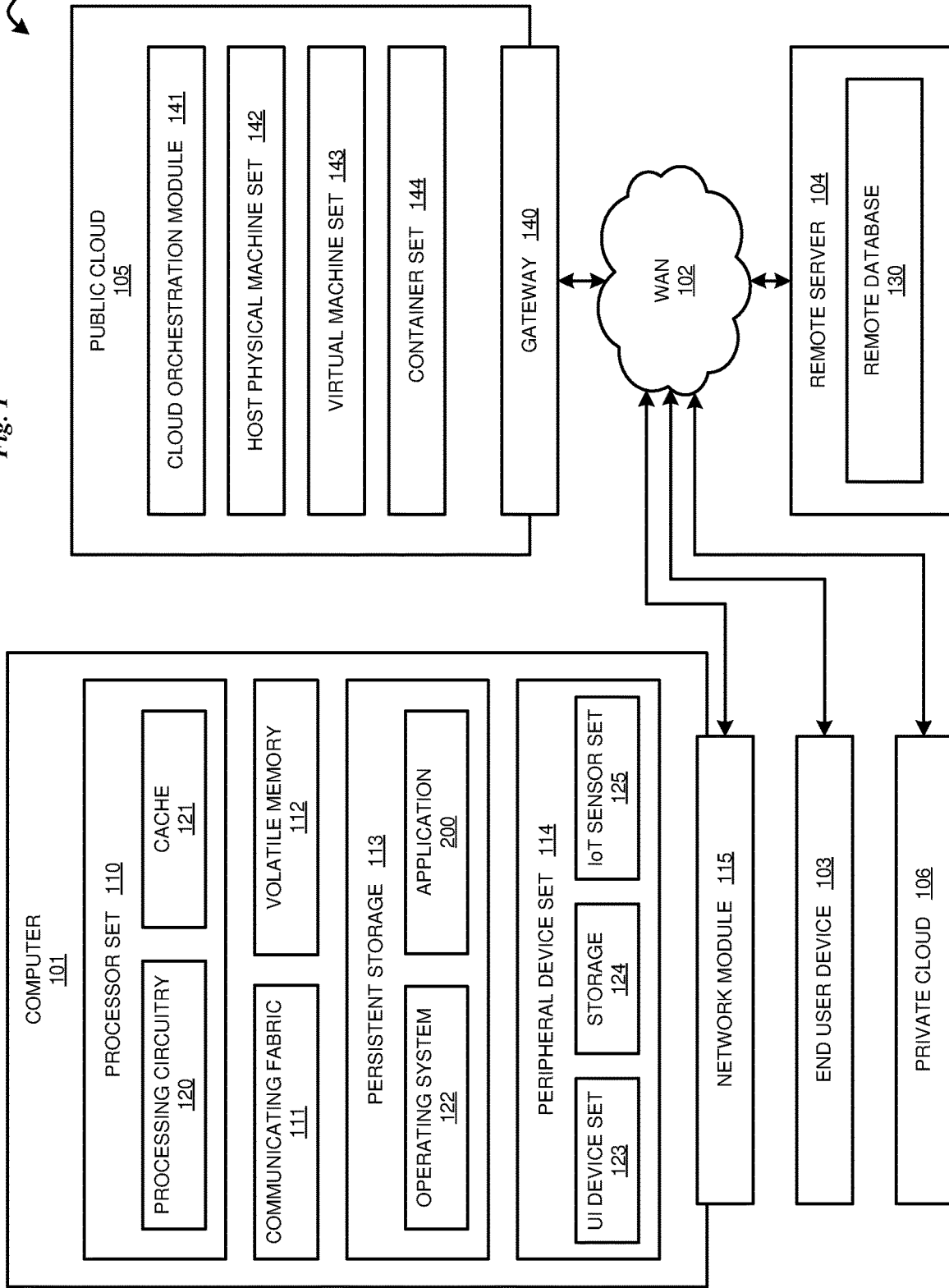
FIG. 1 depicts an example diagram of a data processing environments in which illustrative embodiments may be implemented.

The illustrative embodiments recognize that generating a preview, a view of a conversational journey as experienced by an end user, is an important part of developing a conversational model. A preview shows a sequence within a modelled interaction, allowing customers for a particular conversational model (such as business or marketing teams) to determine that the model meets their needs or needs a specific improvement. Generating a preview is also referred to as previewing. Currently available previewing systems focus mostly on previewing as a testing tool for debugging a conversational model. However, there are other use cases where previews are useful, such as sharing a video or document of a new conversational path with customers or management or to facilitate discussions between engineering teams and user experience designers. Currently available previewing tools require a user to interact with a conversational model, manually generating each input to a model and recording the results (e.g., using a screen capture tool). However, it is difficult for a human user to generate input that exercises desired branches of a conversational journey, especially as the number of possible paths in a journey increases. For example, a typical conversational model might have tens of thousands of conversational paths—too many for a human to generate appropriate input for individually. A human is also unlikely to be sufficiently systematic to ensure that all possible paths have been explored. As well, a user might want to generate a preview of a particular portion of a conversational journey (e.g., for use in debugging, or to present a newly-added feature to management or customers), but using currently available previewing tools the user would have to generate all the appropriate input necessary to generate a conversation context simply to get to the desired portion—again, difficult and time-consuming for a human. A user might also want to generate a preview of only the most-used branches of a conversational journey, but currently available tools do not support the integration of data with which to determine the most-used branches of a conversational journey.

In addition, a preview is typically generated on a development system, not a system in which the conversational model will eventually be deployed. As a result, integrations necessary to obtain data from an external system, or the authentications used to obtain the data (necessary to generate a particular system response in the preview, set context variables such as whether or not a valid password was entered, and determine which branch to take) are often unavailable automatically and too numerous for a preview generating user to set individually.

As well, a conversational model is often able to interact with its users via different communications applications, with different user interfaces and appearances. Hence, a generated preview should present a conversational journey as it would appear in any supported communications applications. However, generating a preview using currently available tools requires that a user repeat the manual interactions using each different supported communication application, consuming additional time.

Thus, the illustrative embodiments recognize that there is an unmet need to automatically generate a conversational experience preview, of all or a portion of the experience, without relying on external data from a user or another application (thus, self-contained).

The illustrative embodiments recognize that the presently available tools or solutions do not address these needs or provide adequate solutions for these needs. The illustrative embodiments used to describe the invention generally address and solve the above-described problems and other problems related to self-contained conversational experience previewing.

An embodiment can be implemented as a software application. The application implementing an embodiment can be configured as a modification of an existing conversational system, as a separate application that operates in conjunction with an existing conversational system, a standalone application, or some combination thereof.

Particularly, some illustrative embodiments provide a method that extracts, from a conversation model, constraints for conversational steps implemented by the conversation model, uses the conversional steps and constraints to construct a graph, extracts flow data from usage data of the conversation model, populates an edge in the graph with flow data denoting a probability associated with the edge, and generates an experience preview by traversing a portion of the graph.

An embodiment receives a conversational model, including actions, steps, intents, and entities the model knows how to process and the dialogue nodes associated with a conversational journey the model implements. An embodiment also receives usage data of the model. Usage data is data of how the model was used with actual users. Some non-limiting examples of usage data are logs of conversations with users and aggregated data extracted from conversations with users (e.g., how many users entered input at a dialogue node that cause the model to proceed to each possible branch from the node). An embodiment also receives an exploration parameter indicating data of the user's desired preview. Some non-limiting examples of an exploration parameter are where the preview should start or end, whether the preview should include all, a subset, or the most-used conversational journeys, and the user's desired communications application.

An embodiment extracts, from the conversational model, entry constraints and aggregate state constraints for steps implemented by the conversational model. An entry constraint for a step is a constraint governing how that step was reached. For example, to enter the first step in a conversational journey implementing appointment scheduling, a user would have had to indicate an intent to schedule an appointment. Thus, an entry constraint to this first step is the "schedule an appointment" intent. An aggregate state constraint for a step is an aggregation of all the constraints that were satisfied (i.e., known to be true) to reach that step. For example, to reach the last step in the conversational journey implementing appointment scheduling, a user would have had to provide valid inputs for all the questions along the journey, including a valid date, available time, valid contact information, and the like.

An embodiment uses the entry constraints, aggregate state constraints, and steps implemented by the conversational model to construct a directed graph. Each node in the graph represents a conversational step, and includes constraints that are satisfied in that conversational step. Each directed edge in the graph represents a possible execution path from one step to another, if a constraint associated with proceeding from one step to another via the edge is satisfied. To construct the graph, an embodiment uses a presently available technique.

An embodiment extracts flow data from usage data of the conversational model. Flow data of a conversational step with multiple subsequent steps is data indicating a percentage of users who proceeded to each subsequent step. For example, within a conversational journey implementing appointment scheduling, after a step asking a user to enter a date an embodiment might determine that ten percent of users entered a date in the past and proceeded to a step processing that condition, while ninety percent of users entered a date in the future and proceeded to a step processing that condition.

An embodiment populates an edge in the graph with flow data denoting a probability associated with that edge. For example, continuing the appointment scheduling example, from a step asking a user to enter a date one edge might be populated with the 10 percent probability and another edge might be populated with the 90 percent probability.

An embodiment generates a conversational experience preview, or simply preview, by traversing a portion of the graph. The preview demonstrates a user experience of a portion of the conversation model. In particular, to traverse a portion of the graph, an embodiment begins at a graph node corresponding to an experience parameter specifying where the preview is to begin. An embodiment generates preview output specified by the conversational step the graph node represents. If the conversational step includes a placeholder for the value of a variable, an embodiment synthesizes a value for the variable and inserts the synthesized value into the placeholder to generate the preview output. For example, if the starting node represents a conversational step specifying the output "Welcome to $OfficeName", where $OfficeName is a variable, an embodiment synthesizes a value for the $OfficeName (e.g., "Demo Store") and inserts the synthesized value into the placeholder to generate the preview output (e.g., "Welcome to Demo Store"). A synthesized value for a variable must satisfy any constraints that are satisfied in that conversational step. For example, if there are five possible options for the value of a variable, an embodiment selects one of the five possible options as the synthesized value of the variable. To synthesize a value for a variable, an embodiment uses the usage data to select a value used in a real interaction with a user, uses a random value, or uses a value indicating the placeholder nature of the value (e.g., "Welcome to [Office Name]").

From the initial graph node, an embodiment systematically explores the graph. To traverse an edge from one step to another, an embodiment synthesizes user input that satisfies a constraint associated with proceeding along that edge and uses the synthesized user input to generate preview output. For example, consider a graph portion including three nodes. Execution proceeds from step 1 to step 3 if a date entered by a user in step 1 is equal to or after the current date, and proceeds from step 1 to step 2 if a date entered by a user in step 1 is before the current date. Thus, if an embodiment is traversing the graph from step 1 to step 3, the embodiment synthesizes user input that satisfies the step 1-step 3 constraint that the date entered by a user in step 1 is equal to or after the current date. Instead, if an embodiment is traversing the graph from step 1 to step 2, the embodiment synthesizes user input that satisfies the step 1-step 2 constraint that the date entered by a user in step 1 is before the current date.

If an experience parameter specifies that the preview include all possible paths from the initial graph node, an embodiment traverses all possible paths from the initial graph node, using a presently known graph traversal technique, generating preview output according to the constraints of each encountered node. If an experience parameter specifies that the preview include only the most-used path from the initial graph node, an embodiment uses the usage data to determine the most-used path at each node with more than one branch, and traverses the most-used path, generating preview output according to the constraints of each encountered node. If an experience parameter specifies that the preview end at a specific node or state, or after a specified number of steps, an embodiment ends the graph traversal as the experience parameter specifies. Otherwise, an embodiment ends the graph traversal when there are no more nodes to be traversed (if all possible paths are being traversed) or when encountering a node (if only the most-used nodes are being traversed) that does not have any edges connecting to another node.

An embodiment causes display of the generated preview output in a communications channel specified by an experience parameter, or using another presently available technique.

The manner of self-contained conversational experience previewing described herein is unavailable in the presently available methods in the technological field of endeavor pertaining to natural language conversational systems. A method of an embodiment described herein, when implemented to execute on a device or data processing system, comprises substantial advancement of the functionality of that device or data processing system in extracting, from a conversation model, constraints for conversational steps implemented by the conversation model, using the conversional steps and constraints to construct a graph, extracting flow data from usage data of the conversation model, populating an edge in the graph with flow data denoting a probability associated with the edge, and generating an experience preview by traversing a portion of the graph.

The illustrative embodiments are described with respect to certain types of conversational models, conversational steps, constraints, graphs, usage data, flow data, variables, experience parameters, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a self-contained conversational experience previewing embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. In addition, application 200 need not execute on the same system as the conversational model for which application 200 generates a preview.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
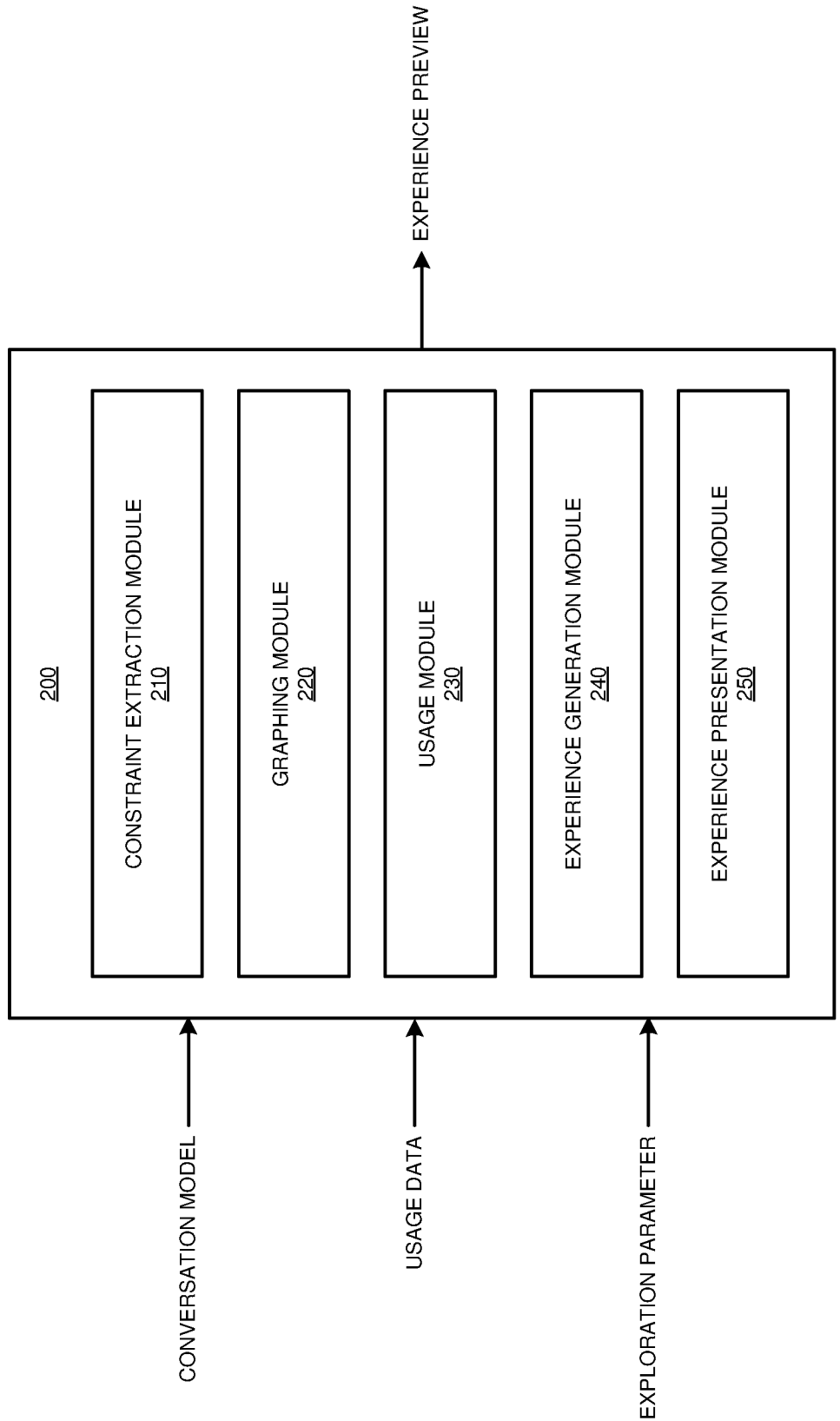
FIG. 2 depicts a block diagram of an example configuration for self-contained conversational experience previewing in accordance with an illustrative embodiment.

With reference to FIG. 2, this figure depicts a block diagram of an example configuration for self-contained conversational experience previewing in accordance with an illustrative embodiment. Application 200 is the same as application 200 in FIG. 1.

Application 200 receives a conversational model, including intents and entities the model knows how to process and the dialogue nodes associated with a conversational journey the model implements. Application 200 also receives usage data of the model. Application 200 also receives an exploration parameter indicating data of the user's desired preview.

Constraint extraction module 210 extracts, from the conversational model, entry constraints and aggregate state constraints for steps implemented by the conversational model. An entry constraint for a step is a constraint governing how that step was reached. An aggregate state constraint for a step is an aggregation of all the constraints that were satisfied (i.e., known to be true) to reach that step.

Graphing module 220 uses the entry constraints, aggregate state constraints, and steps implemented by the conversational model to construct a directed graph. Each node in the graph represents a conversational step, and includes constraints that are satisfied in that conversational step. Each directed edge in the graph represents a possible execution path from one step to another, if a constraint associated with proceeding from one step to another via the edge is satisfied. To construct the graph, module 220 uses a presently available technique.

Usage module 230 extracts flow data from usage data of the conversational model. Flow data of a conversational step with multiple subsequent steps is data indicating a percentage of users who proceeded to each subsequent step. Module 230 populates an edge in the graph with flow data denoting a probability associated with that edge.

Experience generation module 240 generates a conversational experience preview, or simply preview, by traversing a portion of the graph. The preview demonstrates a user experience of a portion of the conversation model. In particular, to traverse a portion of the graph, module 240 begins at a graph node corresponding to an experience parameter specifying where the preview is to begin. Module 240 generates preview output specified by the conversational step the graph node represents. If the conversational step includes a placeholder for the value of a variable, module 240 synthesizes a value for the variable and inserts the synthesized value into the placeholder to generate the preview output. A synthesized value for a variable must satisfy any constraints that are satisfied in that conversational step. To synthesize a value for a variable, module 240 uses the usage data to select a value used in a real interaction with a user, uses a random value, or uses a value indicating the placeholder nature of the value.

From the initial graph node, module 240 systematically explores the graph. To traverse an edge from one step to another, module 240 synthesizes user input that satisfies a constraint associated with proceeding along that edge and uses the synthesized user input to generate preview output.

If an experience parameter specifies that the preview include all possible paths from the initial graph node, module 240 traverses all possible paths from the initial graph node, using a presently known graph traversal technique, generating preview output according to the constraints of each encountered node. If an experience parameter specifies that the preview include only the most-used path from the initial graph node, module 240 uses the usage data to determine the most-used path at each node with more than one branch, and traverses the most-used path, generating preview output according to the constraints of each encountered node. If an experience parameter specifies that the preview ends at a specific node or state, or after a specified number of steps, module 240 ends the graph traversal as the experience parameter specifies. Otherwise, module 240 ends the graph traversal when there are no more nodes to be traversed (if all possible paths are being traversed) or when encountering a node (if only the most-used nodes are being traversed) that does not have any edges connecting to another node.

Experience presentation module 250 causes display of the generated preview output in a communications channel specified by an experience parameter, or using another presently available technique.

Figure 3:
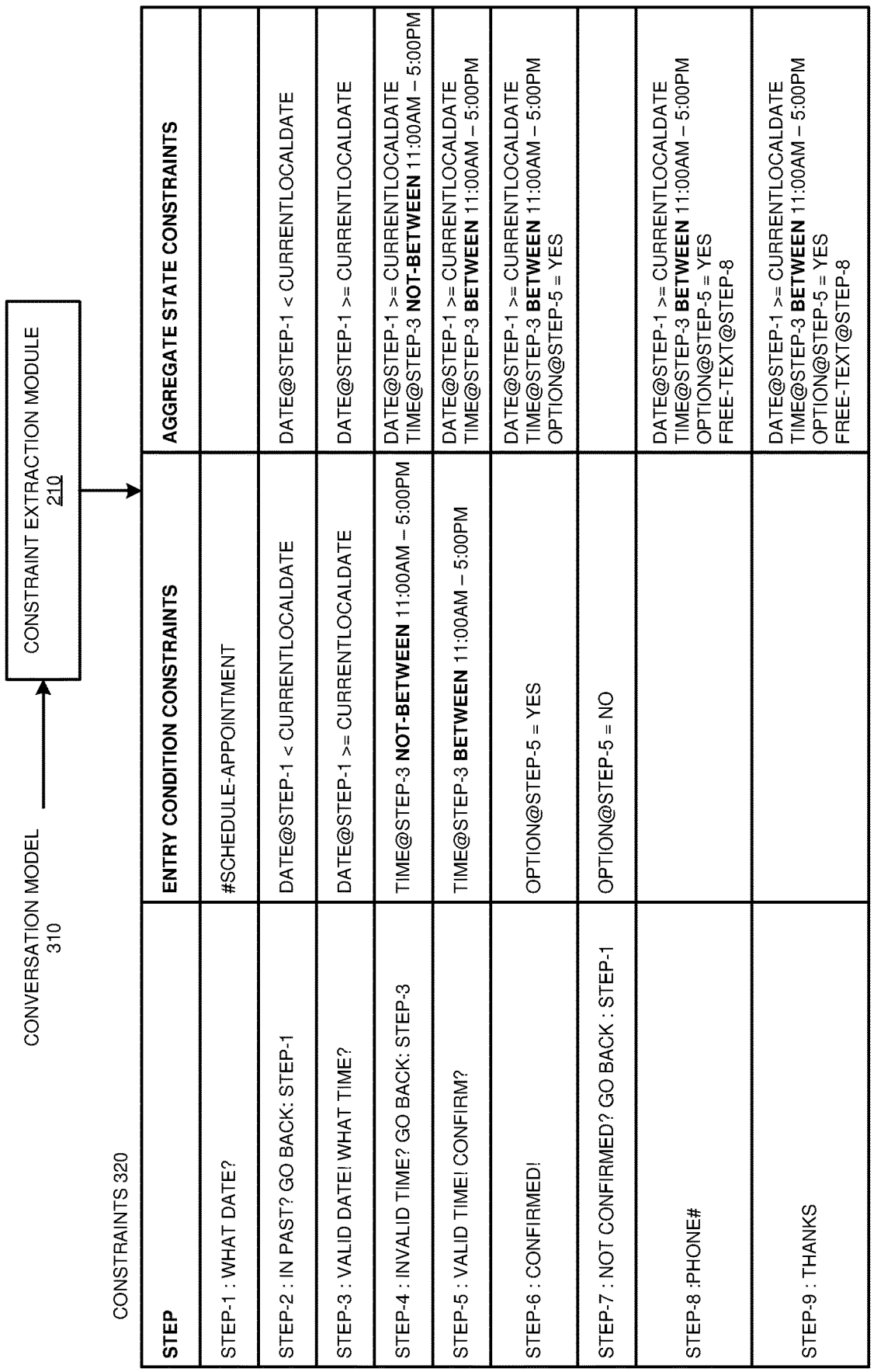
FIG. 3 depicts an example of self-contained conversational experience previewing in accordance with an illustrative embodiment.

With reference to FIG. 3, this figure depicts an example of self-contained conversational experience previewing in accordance with an illustrative embodiment. The example can be executed using application 200 in FIG. 2. Constraint extraction module 210 is the same as constraint extraction module 210 in FIG. 2.

As depicted, constraint extraction module 210 extracts, from conversational model 310, constraints 320. Constraints 320 includes entry constraints and aggregate state constraints for steps implemented by conversational model 310.

Conversational model 310 is an example conversational model implementing an appointment scheduling conversational journey.

With reference to FIG. 4, this figure depicts a continued example of self-contained conversational experience previewing in accordance with an illustrative embodiment. Graphing module 220 is the same as graphing module 220 in FIG. 2. Conversation model 310 and constraints 320 are the same as conversation model 310 and constraints 320 in FIG. 3, although FIG. 3 does not depict details of constraints 320.

Graphing module 220 uses constraints 320 and the steps implemented by conversational model 310 to construct graph. 410 Each node in graph 310 represents a conversational step, and includes constraints that are satisfied in that conversational step. Each directed edge in graph 310 represents a possible execution path from one step to another, if a constraint associated with proceeding from one step to another via the edge is satisfied. For example, execution proceeds from step 1 to step 2 if constraint 420 is satisfied, and execution proceeds from step 1 to step 3 if constraint 430 is satisfied.

Figure 5:
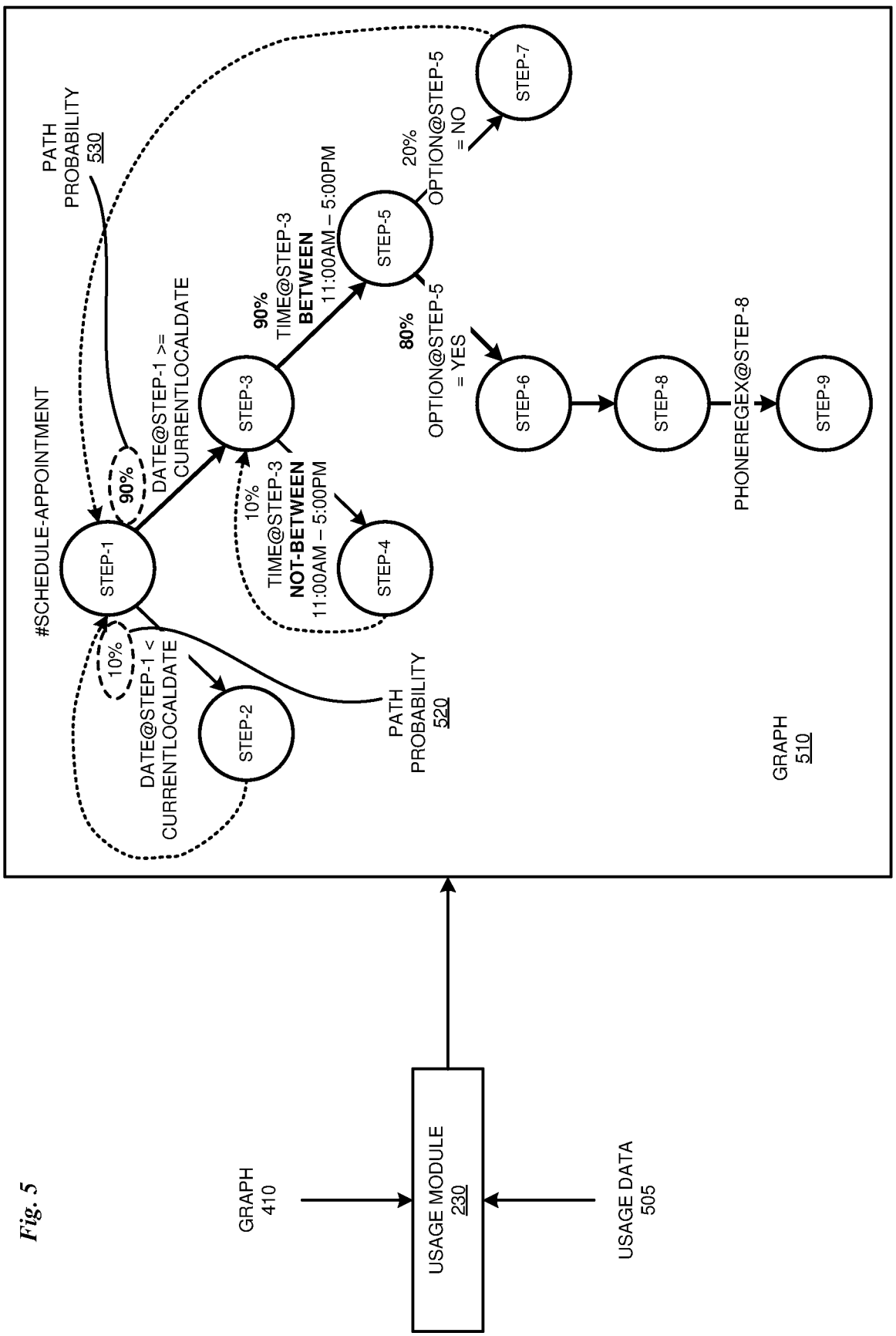
FIG. 5 depicts a continued example of self-contained conversational experience previewing in accordance with an illustrative embodiment.

With reference to FIG. 5, this figure depicts a continued example of self-contained conversational experience previewing in accordance with an illustrative embodiment. Usage module 230 is the same as usage module 230 in FIG. 2. Graph 410 is the same as graph 410 in FIG. 4, although FIG. 5 does not depict details of graph 410.

Usage module 230 extracts flow data from usage data 505 of conversational model 310. Flow data of a conversational step with multiple subsequent steps is data indicating a percentage of users who proceeded to each subsequent step. Module 230 populates an edge in graph 410 with flow data denoting a probability associated with that edge, resulting in graph 510. For example, execution proceeds from step 1 to step 2 with a ten percent probability (depicted as path probability 520), and execution proceeds from step 1 to step 3 with a ninety percent probability (depicted as path probability 530).

Figure 6:
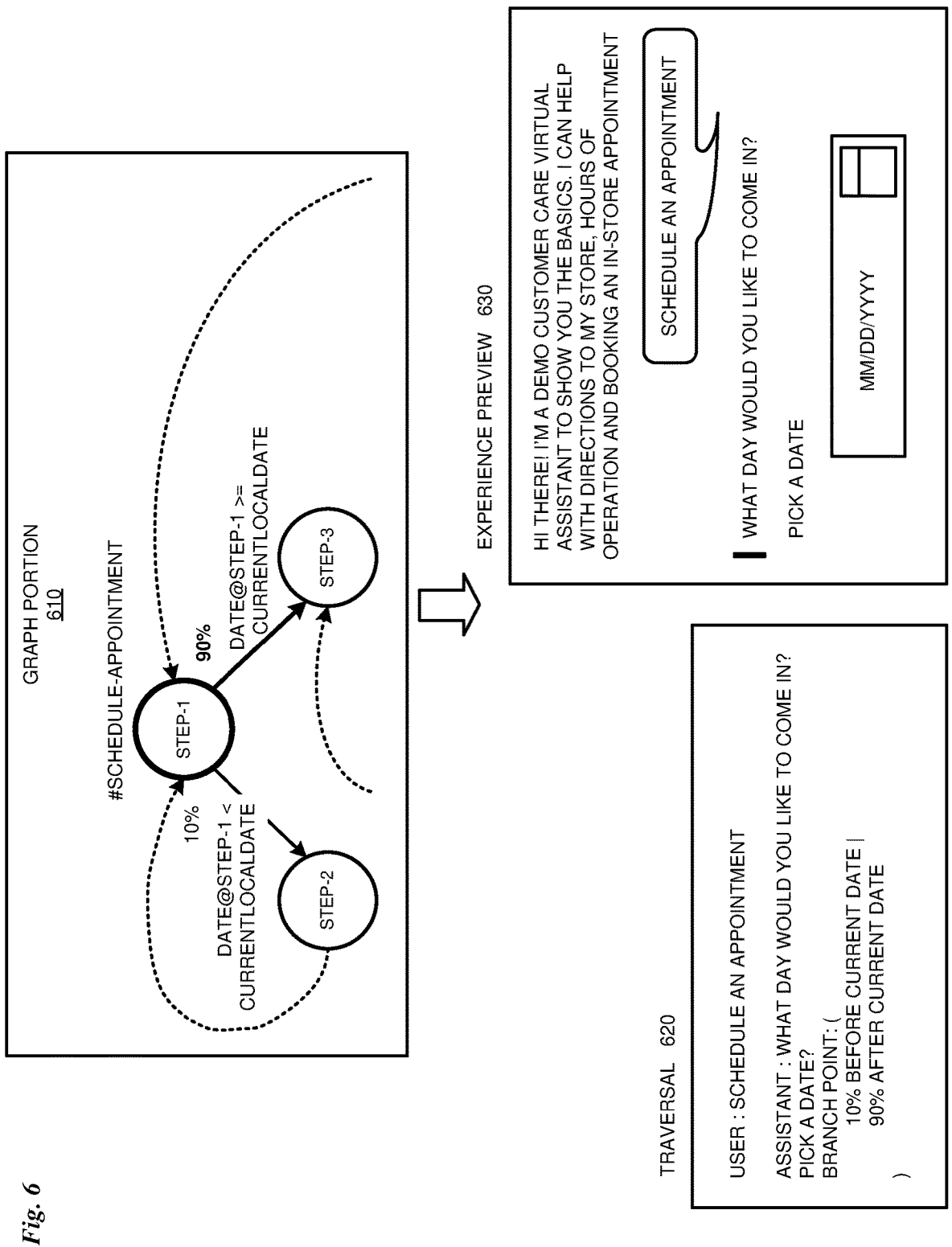
FIG. 6 depicts a continued example of self-contained conversational experience previewing in accordance with an illustrative embodiment.

With reference to FIG. 6, this figure depicts a continued example of self-contained conversational experience previewing in accordance with an illustrative embodiment.

In particular, FIG. 6 depicts a stage in experience generation module 240's generation of a conversational experience preview, or simply preview, by traversing a portion of graph 510. The preview demonstrates a user experience of a portion of the conversation model. Graph portion 610 depicts a portion of graph 510. Module 240 is processing the node of graph 510 corresponding to step 1 in an appointment scheduling process. Traversal 620 depicts a result of traversing graph 510 up to step 1. Experience preview 630 depicts a preview corresponding to traversal 620.

Figure 7:
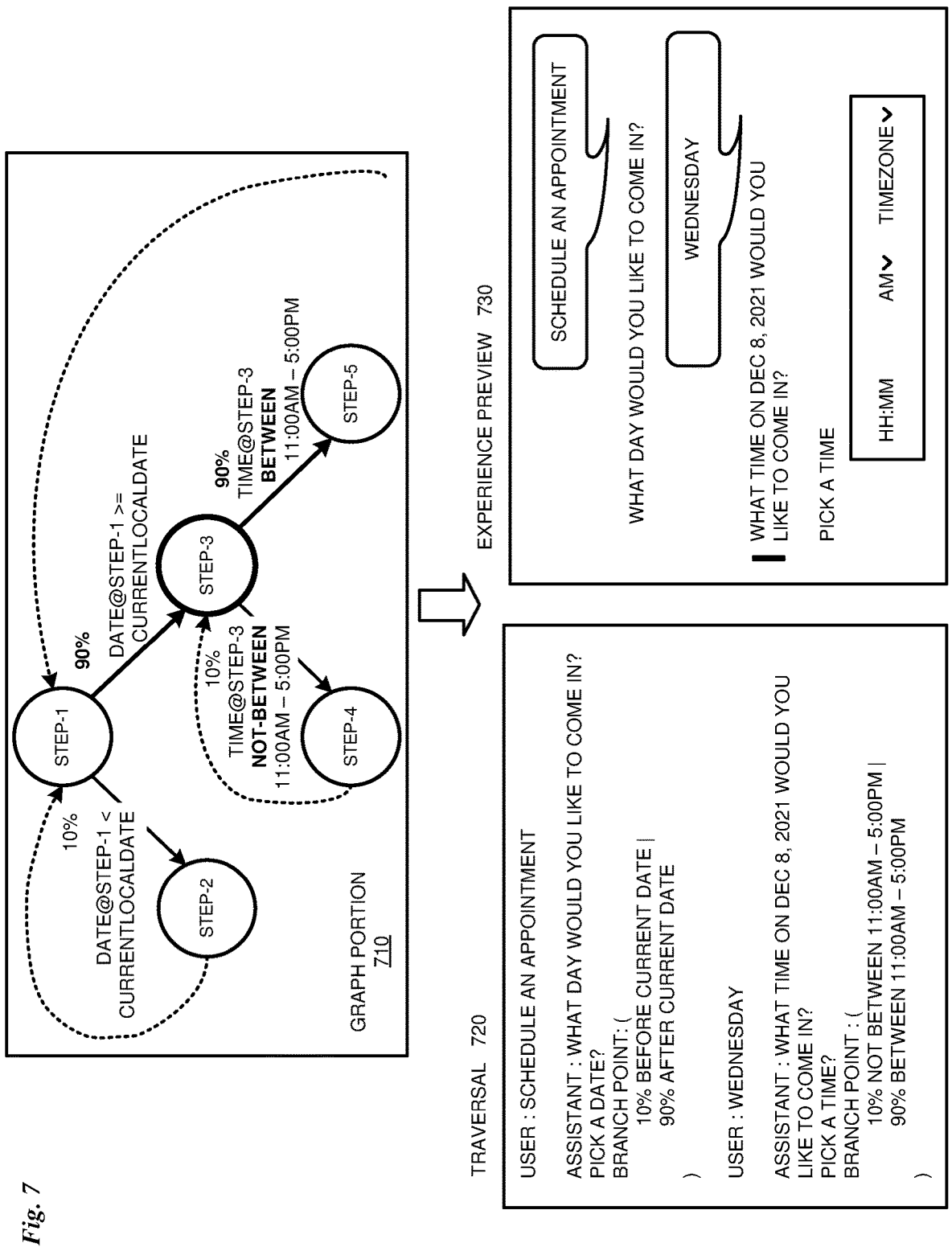
FIG. 7 depicts a continued example of self-contained conversational experience previewing in accordance with an illustrative embodiment.

With reference to FIG. 7, this figure depicts a continued example of self-contained conversational experience previewing in accordance with an illustrative embodiment.

In particular, FIG. 7 depicts a stage in experience generation module 240's generation of a conversational experience preview by traversing a portion of graph 510. The preview demonstrates a user experience of a portion of the conversation model. Graph portion 710 depicts a portion of graph 510. Module 240 is processing the node of graph 510 corresponding to step 3 in an appointment scheduling process, having moved from step 1 to step 3. Traversal 720 depicts a result of traversing graph 510 up to step 3. Experience preview 730 depicts a preview corresponding to traversal 720. In particular, to proceed from step 1 to step 3 requires synthesis of a user input satisfying the date received in step 1 being greater than the current date, so module 240 synthesizes such a user input ("Wednesday", which refers to Dec. 8, 2021, assumed to be in the future). Module 240 also synthesizes the value of a variable in step 3's output (Dec. 8, 2021) and inserts the synthesized value into the output specified by step 3.

With reference to FIG. 8, this figure depicts a continued example of self-contained conversational experience previewing in accordance with an illustrative embodiment.

In particular, FIG. 8 depicts a stage in experience generation module 240's generation of a conversational experience preview by traversing a portion of graph 510. The preview demonstrates a user experience of a portion of the conversation model. Graph portion 810 depicts a portion of graph 510. Module 240 is processing the node of graph 510 corresponding to step 5 in an appointment scheduling process, having moved from step 1 to step 3 to step 5. Traversal 820 depicts a result of traversing graph 510 up to step 5. Experience preview 830 depicts a preview corresponding to traversal 780. In particular, to proceed from step 3 to step 5 requires synthesis of a user input satisfying the constraint that the time received in step 3 be between 11 AM and 5 PM, so module 240 synthesizes such a user input ("2:00 PM"). Module 240 also synthesizes the value of variables in step 5's output (Dec. 8, 2021 at 2:00 PM) and inserts the synthesized values into the output specified by step 5.

With reference to FIG. 9, this figure depicts a continued example of self-contained conversational experience previewing in accordance with an illustrative embodiment.

In particular, FIG. 9 depicts a stage in experience generation module 240's generation of a conversational experience preview by traversing a portion of graph 510. The preview demonstrates a user experience of a portion of the conversation model. Graph portion 910 depicts a portion of graph 510. Module 240 is processing the node of graph 510 corresponding to step 9 in an appointment scheduling process, having moved from step 1 through steps 3, 5, 6, and 8 to step 9. Traversal 920 depicts a result of traversing graph 510 up to step 9. Experience preview 930 depicts a preview corresponding to traversal 920. In particular, to proceed from step 8 to step 9 requires synthesis of a user input satisfying the constraint of being in a telephone number format, so module 240 synthesizes such a user input.

Figure 10:
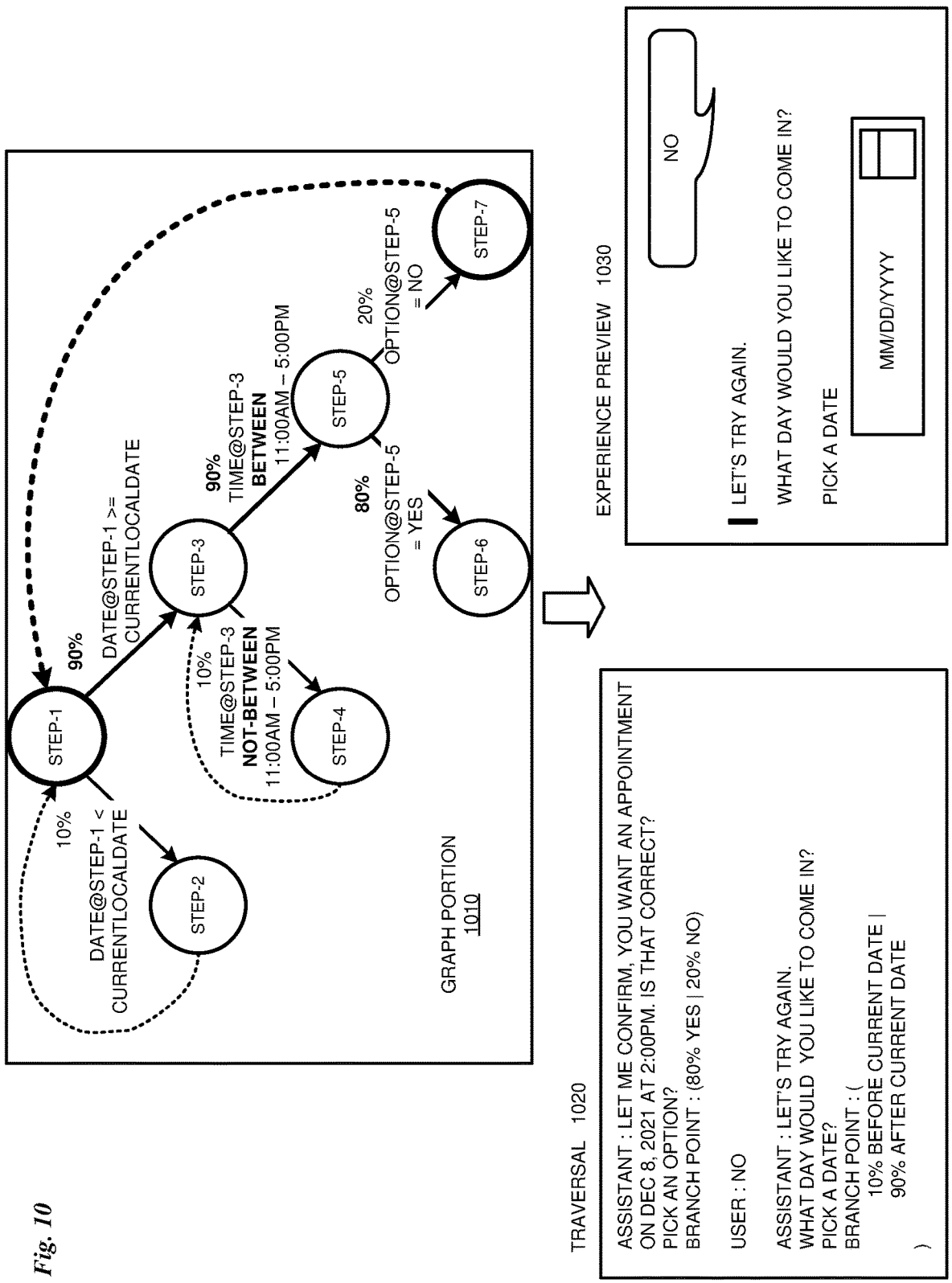
FIG. 10 depicts a continued example of self-contained conversational experience previewing in accordance with an illustrative embodiment.

With reference to FIG. 10, this figure depicts a continued example of self-contained conversational experience previewing in accordance with an illustrative embodiment.

In particular, FIG. 10 depicts a stage in experience generation module 240's generation of a conversational experience preview by traversing a portion of graph 510. The preview demonstrates a user experience of a portion of the conversation model. Graph portion 1010 depicts a portion of graph 510. Module 240 is processing the node of graph 510 corresponding to steps 7 and 1 in an appointment scheduling process, having moved from step 5 to step 7 (instead of step 5 to step 6 as depicted in FIG. 9). Traversal 1020 depicts a result of traversing graph 510 from step 5 to step 7 to step 1. Experience preview 1030 depicts a preview corresponding to traversal 1020. In particular, to proceed from step 5 to step 7 to step 1 requires synthesis of a user input satisfying the constraint needed to move from step 5 to step 7, so module 240 synthesizes such a user input ("no").

Figure 11:
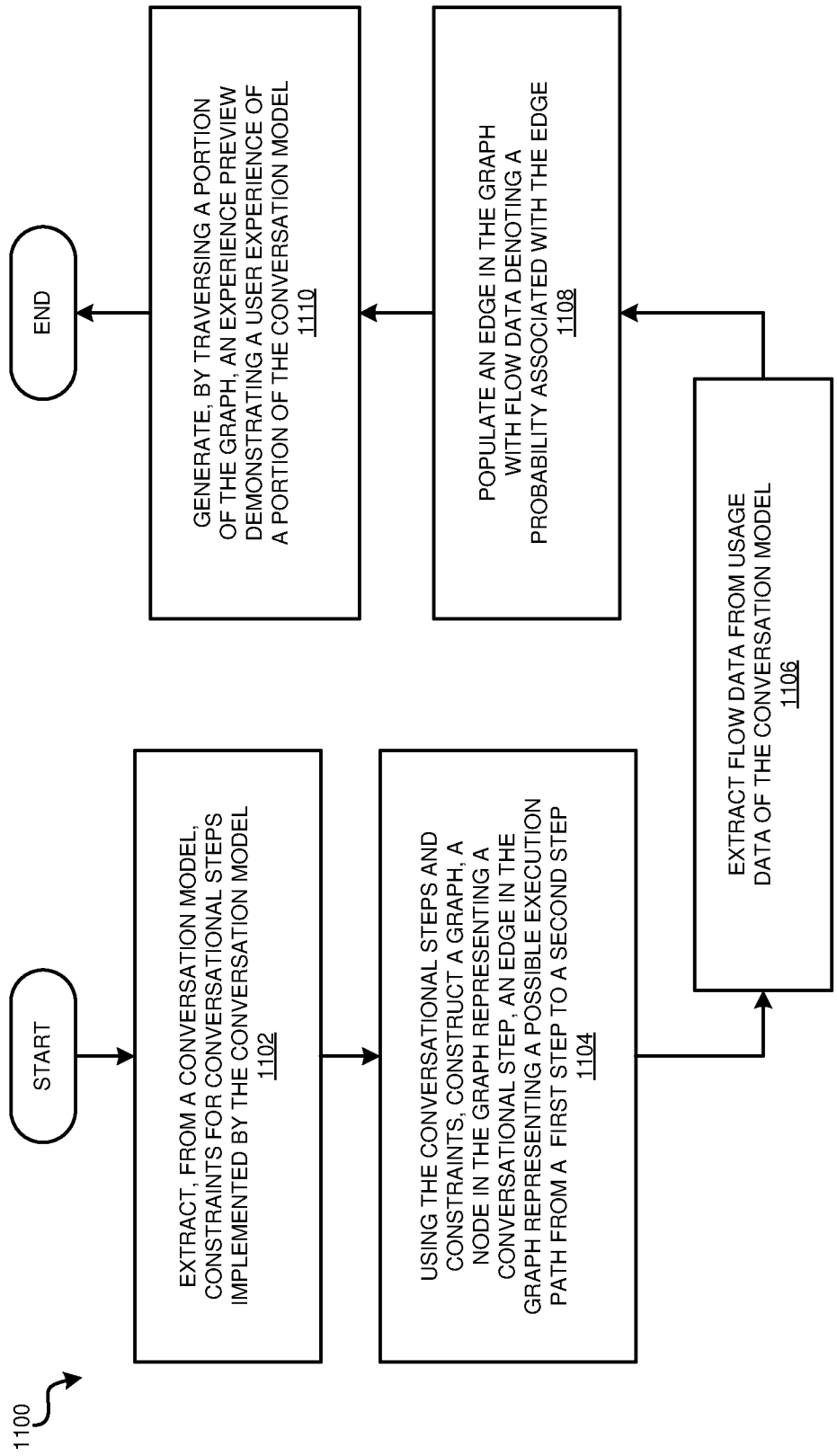
FIG. 11 depicts a flowchart of an example process for self-contained conversational experience previewing in accordance with an illustrative embodiment.

With reference to FIG. 11, this figure depicts a flowchart of an example process for self-contained conversational experience previewing in accordance with an illustrative embodiment. Process 1100 can be implemented in application 200 in FIG. 2.

In block 1102, the application extracts, from a conversation model, constraints for conversational steps implemented by the conversation model. In block 1104, the application, using the conversational steps and constraints, constructs a graph, a node in the graph representing a conversational step, an edge in the graph representing a possible execution path from a first step to a second step. In block 1106, the application extracts flow data from usage data of the conversation model. In block 1108, the application populates an edge in the graph with flow data denoting a probability associated with the edge. In block 1110, the application generates, by traversing a portion of the graph, an experience preview demonstrating a user experience of a portion of the conversation model. Then the application ends.

Thus, a computer implemented method, system or apparatus, and computer program product are provided in the illustrative embodiments for self-contained conversational experience previewing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
extracting, from a conversation model, a plurality of constraints associated with conversational steps implemented by the conversation model;
constructing, using the conversational steps and the constraints, a directed graph, each node in the directed graph representing a conversational step, each directed edge in the directed graph representing a possible execution path from a first conversational step to a second conversational step;
populating an edge in the graph with flow data denoting a probability associated with the edge; and
generating, to form a traversed portion, by traversing a portion of the graph, an experience preview, the experience preview demonstrating a user experience of a portion of the conversation model, wherein the traversed portion of the graph comprises a plurality of most-used edges, the plurality of most-used edges extracted from usage data of the conversation model.

2. The computer-implemented method of claim 1, wherein the plurality of constraints comprises an entry constraint required to be satisfied to reach a conversational step.

3. The computer-implemented method of claim 1, wherein the plurality of constraints comprises an aggregate state constraint of a conversational step, the aggregate state constraint comprising a condition known to be true at the conversational step.

4. The computer-implemented method of claim 1, further comprising: extracting, from usage data of the conversation model, the flow data.

5. The computer-implemented method of claim 1, wherein generating the experience preview comprises:
generating, for a first node in the directed graph, a first portion of the experience preview, the first portion of the experience preview specified by a conversational step represented by the first node;
synthesizing input to the conversational model, the synthesized input satisfying a first constraint in the plurality of constraints, the first constraint associated with traversing an edge from the first node to a second node; and
generating a second portion of the experience preview, the second portion of the experience preview comprising the synthesized input.

6. The computer-implemented method of claim 5, further comprising
synthesizing a first value of a first variable in the first portion, the first value satisfying a second constraint in the plurality of constraints, the second constraint associated with the conversational step.

7. A computer program product comprising one or more computer readable storage medium, and program instructions collectively stored on the one or more computer readable storage medium, the program instructions executable by a processor to cause the processor to perform operations comprising:
extracting, from a conversation model, a plurality of constraints associated with conversational steps implemented by the conversation model;
constructing, using the conversational steps and the constraints, a directed graph, each node in the directed graph representing a conversational step, each directed edge in the directed graph representing a possible execution path from a first conversational step to a second conversational step;
populating an edge in the graph with flow data denoting a probability associated with the edge; and
generating, to form a traversed portion, by traversing a portion of the graph, an experience preview, the experience preview demonstrating a user experience of a portion of the conversation model, wherein the traversed portion of the graph comprises a plurality of most-used edges, the plurality of most-used edges extracted from usage data of the conversation model.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

10. The computer program product of claim 7, wherein the plurality of constraints comprises an entry constraint required to be satisfied to reach a conversational step.

11. The computer program product of claim 7, wherein the plurality of constraints comprises an aggregate state constraint of a conversational step, the aggregate state constraint comprising a condition known to be true at the conversational step.

12. The computer program product of claim 7, further comprising: extracting, from usage data of the conversation model, the flow data.

13. The computer program product of claim 7, wherein generating the experience preview comprises:
generating, for a first node in the directed graph, a first portion of the experience preview, the first portion of the experience preview specified by a conversational step represented by the first node;
synthesizing input to the conversational model, the synthesized input satisfying a first constraint in the plurality of constraints, the first constraint associated with traversing an edge from the first node to a second node; and
generating a second portion of the experience preview, the second portion of the experience preview comprising the synthesized input.

14. The computer program product of claim 13, further comprising
synthesizing a first value of a first variable in the first portion, the first value satisfying a second constraint in the plurality of constraints, the second constraint associated with the conversational step.

15. A computer system comprising a processor and one or more computer readable storage media, and program instructions collectively stored on the one or more computer readable storage media, the program instructions executable by the processor to cause the processor to perform operations comprising:

extracting, from a conversation model, a plurality of constraints associated with conversational steps implemented by the conversation model;

constructing, using the conversational steps and the constraints, a directed graph, each node in the directed graph representing a conversational step, each directed edge in the directed graph representing a possible execution path from a first conversational step to a second conversational step;

populating an edge in the graph with flow data denoting a probability associated with the edge; and generating, to form a traversed portion, by traversing a portion of the graph, an experience preview, the experience preview demonstrating a user experience of a portion of the conversation model, wherein the traversed portion of the graph comprises a plurality of most-used edges, the plurality of most-used edges extracted from usage data of the conversation model.

16. The computer system of claim 15, wherein the plurality of constraints comprises an entry constraint required to be satisfied to reach a conversational step.

17. The computer system of claim 15, wherein the plurality of constraints comprises an aggregate state constraint of a conversational step, the aggregate state constraint comprising a condition known to be true at the conversational step.

18. The computer system of claim 15, further comprising:
extracting, from usage data of the conversation model, the flow data.

* * * * *